April 16, 1940. J. E. LEONARD Re. 21,426
COOKING AND HEATING RANGE
Original Filed June 1, 1935
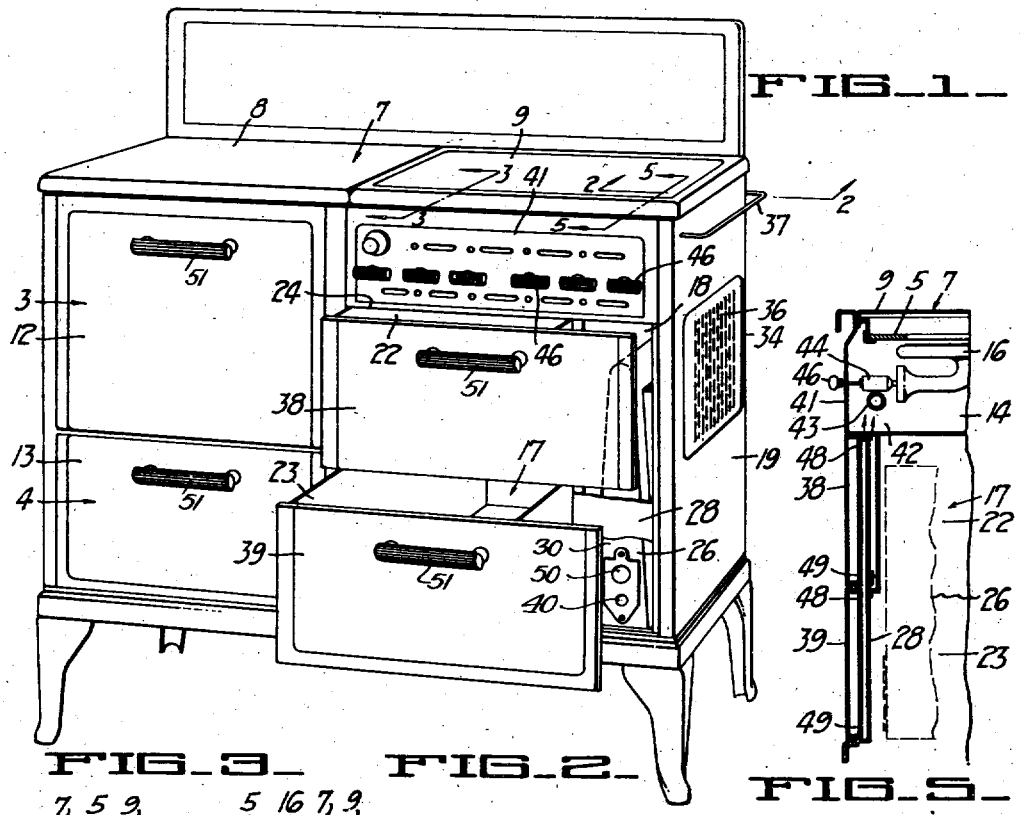
INVENTOR.
Joseph E. Leonard
BY Joseph B. Gardner
ATTORNEY Reissued Apr. 16, 1940 Re. 21,426

UNITED STATES PATENT OFFICE 21,426

COOKING AND HEATING RANGE

Joseph E. Leonard, Berkeley, Calif., assignor to Hammer-Bray Company, Ltd., Oakland, Calif., a corporation of Nevada Original No. 2,068,143, dated January 19, 1937, Serial No. 24,527, June 1, 1935. Application for reissue December 27, 1938, Serial No. 248,007

11 Claims. (Cl. 126—4)

My invention relates to household stoves or ranges which have built in as a part thereof a gas operated air circulating heater, and relates more particularly, insofar as the present embodiment is concerned, to stoves or ranges of the type known as table top stoves.

An object of the invention is to provide a combination cooking and heater range having a relatively large capacity heater whose presence as part of the stove is practically indiscernible insofar as concerns the outward appearance of the stove, and at the same time the range retains the characteristic lines and dimensions of modern stoves not equipped with such heaters.

Another object of the invention is to provide a stove having a heater of the character described, in which the arrangement for the introduction of air for heating and for burning and the outlet of the heated air and of the burned products, is conducive to efficiency of operation of the heater as well as affording the desired incorporation of the heater with the other elements of the stove.

A further object of the invention is to provide a means of affording delivery of cool air from the bottom of the stove to the gas control cocks and handles by way of the portion of the stove beneath the top gas burner chamber without sacrificing any of the space in said portion or in any way interfering with the full use of such space for the purpose adapted.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of a range constructed in accordance with my invention.

Figure 2 is a fragmentary vertical sectional view taken of the range, the plane of the section being indicated by the line 2—2 of Figure 1.

Figure 3 is a fragmentary vertical sectional view of the front portion of the stove taken at right angles to Figure 2, the plane of the section being indicated by the line 3—3 of Figure 1.

Figure 4 is a horizontal sectional view of the range taken on the line 4—4 of Figure 2.

Figure 5 is a fragmentary vertical section similar to Figure 3, but taken on the line 5—5 of Figure 1.

In the embodiment of the invention illustrated, the range, as aforesaid, is of the table top type, that is with all of the stove elements including the oven 3 and broiler 4 arranged below the level of the cooking top 5 and designed to be superimposed by a cover-plate 7 made up desirably of a pair of sections 8 and 9, the latter of which is hinged or otherwise mounted to permit of its being readily raised from or lowered down over the cooking top 5. The oven and broiler compartments are located beneath the section 8 and have provided at the front thereof doors 12 and 13 respectively.

Covered by the cooking plate 5 is a top gas burner chamber 14 in which is disposed burners 15 16 for heating the vessels on the plate. Beneath the chamber 14 and arranged in side by side relation is a warming compartment or closet 17 and a heater compartment 18, the former being located between the heater compartment and the oven and broiler while the latter is positioned to lie at the side of the range with the side wall 19 thereof preferably defining a side end of the range. As here shown, the warming closet and heater compartment are coextensive in vertical length and are together coextensive in width and depth with the top gas burner chamber. A wall 20 separates the warming closet from the heater compartment and suitable runners 21 or the like are provided in the closet for the support of a pair of horizontally slidable drawers 22 and 23 arranged one above the other and movable into and out of the closet through the front opening 24 thereof. The compartment 17 is heated by the heat in compartment 18 and to some extent by the oven and broiler, and serves both as a warming and a utility compartment.

Within the compartment 18 is a relatively narrow vertical shell or casing 26 which provides a combustion chamber and extends, as here shown, practically from the front of the compartment to the rear wall 27 thereof. The casing, as will be clear from the drawing, is provided with a front wall 30 which is positioned inwardly of the forward edges of the walls 19 and 20, and the casing 26 is spaced somewhat inwardly from the front wall 28 and the rear wall 27 of the compartment, as well as from the walls 19 and 20 so as to define vertical passages for the heated air circulating through the compartment. Desirably the casing extends upwardly from the bottom of the compartment, where it is supported on the bottom frame 29 of the range, to a point well up near the top of the compartment and is provided adjacent the bottom of the front wall 30 with a lighter opening 48 and a sight opening 50. A gas burner 31 for heating the casing walls is located at the open lower extremity of the casing where secondary air for burning is also permitted to enter the chamber. Venting of the products in the chamber is afforded through a pipe 32 which leads from the top of the chamber to a flue connection 33 at the rear of the range. An important feature is the location and arrangement of the outlet opening 34 for the air heated and circulating through the heater compartment. As will be clear from Figures 1 and 2 such opening is located in the wall 19 and takes up practically the entire upper half of the wall so as to leave substantially exposed most of the upper half of the casing 26. By reason of the size and positioning of the opening, not only is there permitted a free discharge of the heated air but a large area for the most effective heating by direct radiation is afforded. Desirably the opening is engaged by a grill 36 of ornamental nature, and a rack 37 for supporting dish towels, etc., for drying over the opening, is pivotally secured to the rear wall of the stove and arranged for normal positioning at the side of the stove directly above the opening.

It is to be particularly noted that since the heater unit or casing 26 is so relatively narrow, the width of the compartment 18 is required to be but a small portion of the horizontal space beneath the top gas burner chamber. In this manner practically all of the space beneath the top gas burner chamber remains available for use as a warming closet and no increase in the width of the range is necessary for accommodating the heater.

In order that the range will retain in appearance the effect of compactness such as is so necessary, particularly in the table top type of stove, I arrange for covering the closet and heater compartment area at the front of the stove with the same members. As will be seen from Figure 1, the drawers 23 and 24 are provided with front panels 38 and 39 respectively, which together provide a complete closure for the closet when the drawers are fully inserted therein. The panels however, are not only large enough to enclose the warming closet, but are made wide enough so as to completely cover the entire front of the heater compartment as well. In accordance with the foregoing each panel is extended at the end adjacent the heater compartment an amount equal to the width of the latter and thus both panels in horizontal dimension will be coextensive and completely harmonize with the panel or covering 41 in front of the top gas burner chamber. It is important to note that with this arrangement there need be but a single vertical division line across the entire front of the stove, and since the panel 39 and the broiler door are co-terminous at the bottom and the meeting adges of the oven and broiler doors are arranged to be in horizontal registration, considerable harmony in the horizontal division lines is also maintained.

An important feature of the invention resides in the construction and arrangement of the parts so as to keep relatively cool during the operation of the stove and particularly the heater, the space 42 at the front of the top gas burner chamber, since in this space is located the fuel line manifold 43 and the burner control valves 44, the handles 46 for which are located at the front of the perforated plate 41. As will be clear from Figures 3 and 5, the space 42 is desirably partitioned off—at least in part—from the portion of the chamber in which the burners are located, and such space 42 is open at the bottom so that air may enter same and pass out through the perforations in plate 41 after circulating over the manifold connections and control valves, and thus keeping the parts including the handles comparatively cool. Unless provision is otherwise made, when the panels 38 and 39 are in fully closed position very little air, particularly the relatively cool air from adjacent the bottom of the stove will find its way to the space 42. Heretofore, it has been sometimes attempted to provide for this desired delivery of cool air by perforating the bottom member of the drawer, but quite frequently in the use of the stove such perforations become inadvertently covered with articles placed in the drawer and as a result the flow of cool air to said space is seriously curtailed. In accordance with my invention, the panels for the drawers are formed hollow or otherwise constructed to provide a vertical passage, and the bottom member joins the panel at a point intermediate rows of openings 48 and 49 respectively disposed near the top and bottom of the inner wall of each panel. With this construction air may enter the open bottom of the closet and find its way through the panels to the space 42 notwithstanding the fact that the drawers may be fully closed and the bottom members thereof entirely covered. In a somewhat similar way the air from adjacent the bottom of the stove may reach the portion of the space 42 over the heater compartment. In this connection, it is to be noted that by reason of the use and positioning of the front wall 28 not only will the heat from the compartment be effectively confined to the interior of the compartment, but a direct cold air passage will be afforded between such wall and the adjacent portion of the drawer panels even when the drawers are in fully closed position, cold air being admitted to the lower portion of such passage through the narrow space left between the side wall of the lower drawer and the adjacent vertical edge of the wall 28.

It is to be noted that by utilizing the drawer panels 38 and 39 for closing the area in front of the heater compartment, not only is the requirement for a separate door eliminated, but the attendant difficulty of providing a door knob or handle which would be practical and of a design in keeping with the long horizontally extending handles 51 on the panels and on the oven and broiler doors, does not arise.

I claim:

1. In a cooking and heating stove, gas burners, a fuel manifold, control cocks for the burners, a top gas burner chamber with a space at the front of the stove for the fuel manifold and control cocks, a compartment underneath said chamber and communicated therewith and extending substantially to the front of the stove, and a closure member normally covering the area at the front of said compartment having a vertical passage therethrough for delivering air from said compartment adjacent the lower extremity of said closure to the space aforesaid.

2. In a cooking and heating stove, gas burners, a fuel manifold, control cocks for the burners, a top gas burner chamber with a space in the front thereof for the fuel manifold and control cocks for the burners, a warming compartment underneath and communicated with said chamber and extending to the front of the stove, and a plurality of drawers in said compartment one above another and having front panels together normally closing said compartment and having therethrough substantially for the width of said compartment a passage for delivering air from the bottom of the stove to said space.

3. In a cooking and heating stove, gas burners, a fuel manifold, control cocks for the burners, a top gas burner chamber with a space in the front thereof for the fuel manifold and control cocks for the burners, a compartment beneath said chamber and contiguous thereto and having a vertical front wall spaced inwardly from the front side of the stove, a heating unit within said compartment, and a closure member for the portion of the stove in front of said wall spaced therefrom to provide therebetween a passage for delivery of air from the bottom of the stove to the space in the front of said burner chamber.

4. In a cooking and heating stove, gas burners, a fuel manifold, control cocks for the burners, a top gas burner chamber with a space in the front thereof for the fuel manifold and control cocks for the burners, a closet and a heater compartment arranged in side by side relation underneath said chamber and contiguous thereto, a plurality of drawers in said closet one above another and having front members together normally closing the closet at the front thereof and having therethrough substantially for the width of the closet a passage for delivering air from the bottom of the stove to the space aforesaid, a vertical front wall spaced inwardly from the front side of the stove, and a heat unit within said compartment, said front members extending widthwise to cover the portion of the stove in front of said wall and being spaced therefrom to provide therebetween a passage for delivering air from the bottom of the stove to the space aforesaid.

5. In a stove having an air circulating heater incorporated therein, a stove body having a pair of compartments in side by side relation and extending substantially to the front of said body, a combustion chamber shell in one of said compartments, air circulating passages in said shell containing compartment heated by said shell, said other compartment being warmed by said shell, a register for said passages provided in an exterior wall of the portion of said stove body containing said compartment and characterizing said stove portion exteriorly as an air circulating heater unit, a drawer mounted in the other of said compartments and including a panel defining the front wall of said stove body and extending laterally from said drawer to provide a front covering for said drawer containing compartment and for said heater shell containing compartment.

6. In a cooking stove having an air circulating heater incorporated therein, a stove body having a pair of compartments in substantially vertically coextensive and side by side relation and extending substantially to the front of said body; a combustion chamber shell and burner therefor in one of said compartments, a front wall for said shell containing compartment having an opening in the lower portion thereof for access to said burner, air circulating passages between said shell and the compartment therefor said other compartment being warmed by said shell, said body having an exterior end wall defining a side of said shell containing compartment, a register in said end wall for the discharge of the heated air from said passages, a plurality of superposed drawers mounted in the other of said compartments and provided with panels coacting to provide a front stove portion substantially completely covering the drawer compartment and having laterally extended portions extending to said register containing wall to define a complete stove front for said shell containing compartment, said panels being movable independent of one another whereby the lower and upper portions of the front wall of the shell containing compartment may be covered or uncovered independently of each other.

7. In a cooking and heating range, a cooking top overlying an end portion of the range, a chamber under said top for inclusion therein of burner means, a compartment underlying said chamber and defined by an end wall of the range and a parallel wall spaced inwardly therefrom and by the front and rear walls of the range and the bottom wall of said chamber, a heater casing in said compartment spaced from said walls thereof and defining therewith air circulating passages, a burner in said casing and a register in said end wall at the top portion of said compartment communicating with said passages and providing substantially the sole outlet for the air heated therein.

8. In a cooking and heating range, a cooking top overlying an end portion of the range, a wall forming the end of the range and having an air outlet opening therein, a compartment beneath said top defined in part by said end wall and an inner wall opposite to said end wall and spaced a relatively short distance therefrom, a heater unit in said compartment spaced from said end and other wall to define therewith air circulating passages in communication with said outlet opening, all of the sides of said compartment including the top thereof and excepting said end wall being substantially imperforate and normally closed whereby substantially all of the air heated in said passages will be caused to discharge through said end wall.

9. In a cooking and heating range having a cooking top overlying an end portion of the range, a wall forming the end of the range, a normally closed compartment extending substantially from the front to the rear of the range and defined in part by said end wall and a second wall opposite thereto and spaced a relatively short distance therefrom, a heater unit in said compartment spaced from said walls to define an air circulating passage, and a single air discharge means in said compartment comprising a register in said wall substantially coextensive in depth with said compartment.

10. In a gas cooking and heating range having a cooking top overlying an end portion of the range, a vertical wall extending downwardly from the outer end of said top and forming an end of said range, a chamber located below and adjacent to said cooking top and having a bottom wall spaced from said cooking top, a compartment defined in part by said end wall and the bottom wall of said chamber and extending from adjacent the front to the rear of the range, a combustion chamber casing extending from substantially the front to the rear of said compartment and defining with said end wall an air circulating passage, a gas burner in said combustion chamber, and air discharge means in said end wall communicating with said passage and substantially coextensive with said casing from the front to the rear thereof.

11. In a gas cooking and heating range, a cooking top, an oven at one portion of said range underlying said top, a top gas-burner chamber underlying said top and extending to one end of said range, a compartment beneath said chamber, a vertical end wall for said range forming an end closure for said chamber and compartment and having a register in the portion at said compartment, a fixed closure for said compartment inwardly of the front of the stove, a combustion chamber casing in said compartment spaced from said end wall and front closure and defining with such wall and closure air circulating spaces communicating with said register, a gas burner in said casing, and a movable member forming the front of the stove in front of said fixed wall.

JOSEPH E. LEONARD.